United States Patent [19]
LaBrash et al.

[11] Patent Number: 5,567,234
[45] Date of Patent: Oct. 22, 1996

[54] LOW MISTING SPRAYABLE DISPERSION OF COLLOIDAL SILICA WITH XANTHAN GUM

[75] Inventors: Robert A. LaBrash, Roseville; Stephen M. Willging, Minneapolis, both of Minn.

[73] Assignee: H. B. Fuller Licensing & Financing, Inc., Arden Hills, Minn.

[21] Appl. No.: 575,586

[22] Filed: Dec. 20, 1995

Related U.S. Application Data

[63] Continuation of Ser. No. 81,543, Jun. 23, 1993, abandoned.

[51] Int. Cl.$^6$ ............................ C09D 105/00; C08L 5/00
[52] U.S. Cl. ........................................ 106/205.9; 162/178
[58] Field of Search ............................. 106/208; 162/178

[56] References Cited

U.S. PATENT DOCUMENTS

| | | | |
|---|---|---|---|
| 3,734,801 | 5/1973 | Sebel | 106/205 |
| 4,234,437 | 11/1980 | Friber et al. | 256/62.51 |
| 4,260,396 | 4/1981 | Glemza | 51/308 |
| 4,418,111 | 11/1983 | Carstens | 428/145 |
| 4,452,723 | 5/1984 | Carstens | 106/287.24 |
| 4,833,025 | 5/1989 | Rossi | 428/357 |

FOREIGN PATENT DOCUMENTS

0460896A2  3/1991  European Pat. Off. .......... C09D 7/00

OTHER PUBLICATIONS

Abstract: "Biogums for Dispersion Stabilization", Dr. W. G. Rakitsky, Kelco, Division of Merck & Co., Inc. Technical Report, vol. Two, Spring 1991. no month avail.

Abstract: "Polymorphism and Drug Release Behavior of Spray-Dried Microcapsules of Sulfamethoxazole with Polysaccharide Gum and Colloidal Silica", Drug Development and Industrial Pharmacy, 9)8), 1445–1463, 1983. no month avail.

Abstract: "Polymorphism of Spray-Dried Microencapsulated Sulfamethoxazole with Cellulose Acetate Phthalate and Colloidal Silica, Montmorillonite, or Talc", Journal of Pharmaceutical Sciences, vol. 70, No. 11, 1981. no month avail.

Abstract: "Characterization of pulverized amorphous synethic silicas", Chem. Tech. (Leipzig), vol. 38, No. 7, 1986. no month avail.

Abstract: "Surface chemistry of colloidal silica and a possible application to stabilize aspirin in solid matrixes", J. Pharm. Sci. vol. 68, No. 2, 1979. no month avail.

Abstract: "Photographic materials comprising developer layers and binders comprising silica sol", US 4001022 770104. Jan. 1977.

Abstract: "Quick-curing, water-resistant silica-alkali metal coatings", US 3988282 761026. Oct. 1976.

Abstract: "Spherical solid dispersion containing amorphous tolbutamide embedded in enteric coating polymers or colloidal silica prepared by spray-drying technique", Chem. Pharm Bull. vol. 35, No. 9, 1987. no month avail.

Abstract: "Preparation of Si2N20 based sintered bodies from powders made by nitridation of amorphous silica in ammonia", Mater. Sci. Monogr. vol. 38 A,1987. no month avail.

Abstract: "The influence of spray- and freeze-drying preparation methods on the chemical compositions of six feldspathic galss formulations", Br. Ceram. Trans J. vol. 0, No. 1, 1991. no month avail.

Primary Examiner—David Brunsman
Attorney, Agent, or Firm—Vidas, Arrett & Steinkraus

[57] ABSTRACT

Addition of xanthan gum to aqueous dispersions of colloidal silica containing non-skid compositions for improved spraying.

9 Claims, No Drawings

LOW MISTING SPRAYABLE DISPERSION OF COLLOIDAL SILICA WITH XANTHAN GUM

This is a continuation of application Ser. No. 08/081543 filed on Jun. 23, 1993, now abandoned.

BACKGROUND OF THE INVENTION

This invention relates to improved silica containing non-skid compositions applied to the surfaces of paper products such as corrugated board, paperboard, linerboard and the like, whether virgin or recycled.

In paper mills, such as a plant producing corrugated board for example, it has long been the practice to apply non-skid compositions to at least selected surface areas of the paper product to decrease the slipperiness of the product and facilitate handling, stacking and the like. The non-skid composition of choice has been an aqueous dispersion of colloidal silica, preferably amorphous silica, which may optionally include urea. Additionally, the dispersion may include small amounts (less than 1 part in a 100) of rust inhibitors such as sodium nitrite and/or sodium benzoate, preservatives, alkaline agents to stabilize the silica dispersion, defoamers and the like as is known in this art. All such compositions are referred to hereinafter collectively as "aqueous dispersions of colloidal silica".

The application of the non-skid composition to the paper product is most commonly accomplished by means of low pressure spray heads. Such application has been a source of problems since these dispersion compositions exhibit a great tendency to mist excessively throughout the spray area, distributing the composition over personnel and equipment with drifting fog and clouds and also tending to clog the spray heads. Since spray application is deemed preferred, these non-skid compositions consisting essentially of aqueous dispersions of colloidal silica need to be modified in such a way as to limit and control the misting thereof. This is a primary objective of this invention which provides improved non-skid compositions, substrates carrying those compositions and methods of improving such compositions.

SUMMARY OF THE INVENTION

The invention achieves the aforementioned objectives and improvements by including within aqueous dispersions of colloidal silica a small amount of xanthan gum. This additive has been found to remarkably decrease the misting problems associated with such non-skid compositions without decreasing in any way the non-skid features thereof.

DESCRIPTION OF THE PREFERRED EMBODIMENTS

According to the invention, the xanthan gum may be combined with the aqueous dispersion of colloidal silica in any convenient way. Thus, the xanthan gum (available commercially as a powder) may be dissolved in water and then combined with a colloidal aqueous solution of silica and the concentrations may be adjusted by dilution. Alternatively, the gum may be added directly to the solution.

Colloidal silica solutions are frequently commercially supplied as 5% up to 50% by weight dispersions which are diluted for use. A preferred commercial dispersion of amorphous silica is available from Cabot Corporation, Cab-O-Sil Div. of Tuscola, Ill. 61953-0188, under the tradename Cab-O-Grip containing about 20% silica, balance water. These dispersions may be diluted for use in the invention. Another is available from Nalco Chemical Company of Chicago, Ill., as Nalcoag 1050.

A preferred xanthan gum is available from Kelco, Division of Merck & Co., Inc., Kelco Industrial Group, San Diego, Calif. 92123, under the tradenames Kelzan® or Keltrol®. Xanthan is a natural polymeric polysaccharide gum of extremely high molecular weight.

While various combinations of aqueous dispersions of colloidal silica and xanthan gum have proved suitable, it has been found that a silica/gum composition (based on 100 parts) of about 0.5 to about 19 parts silica, about 0.15 to about 1 part gum, balance water is preferred. Even more preferred is about 3-6 parts silica, 0.4-0.8 parts gum, balance water. If less than about 0.15 parts gum is used, the colloidal dispersion tends to phase out. If more than about 1 part gum is used, the control over misting does not seem to improve further. Also, the upper limit will depend on the spray equipment used and the viscosity which it can handle. Additionally, too much gum retards drying of the applied composition.

The composition of the invention can be sold as described above, ready to use, or it can be sold with less water content and diluted for use as needed. For example, a 4:1 concentrate product might be sold which requires dilution with 4 parts water to 1 part product.

PREFERRED EXAMPLES

I. 84 parts of water and 0.5 parts xanthan gum (Kelzan® S) were mixed together for 20–30 minutes until the mixture thickened uniformly. With continued mixing, 15 parts of Cab-O-Grip II and 0.1 parts of Kathon®LX 1.5% preservative from Rohm & Haas Co., of Philadelphia, Pa. 19105, were added and mixed for about 20 minutes or until uniform. It is then drawn out of the mixer through a filter such as a 120 mesh and may be used. Cab-O-Grip II is a 20% silica dispersion in NaOH and water from Cabot as above noted. This preparation provides a non-skid composition of about 3 parts silica, 0.5 parts gum, 0.1 part preservative, balance water.

II. 74 parts of water and 0.5 parts Kelzan® S were mixed as in Example I. 0.1 part Kathon® LX and 25 parts of Cab-O-Grip II were added as in Example I. This preparation provides a non-skid composition of 5 parts silica, 0.5 parts gum, 1 part preservative.

III. 49.5 parts water, 0.4 parts Kelzan® S, 0.1 part of Kathon® LX and 50 parts of a stable urea silica dispersion, balance water were combined as in previous Examples.

IV. 75 parts of Cab-O-Grip II was mixed with 22 parts of water and 0.5 parts of Kathon® LX1.5. The mixing was adjusted to form a deep vortex and 2.5 parts of Kelzan® S was sifted uniformly and rapidly onto the surface of the vortex wall. The product was mixed for 5 minutes until it thickened and allowed to stand for an hour. It was then remixed to a smooth fluid.

This concentrated mixture has a viscosity of 6000 cps. Where 1 part of this concentration was added to, 4 parts of water and stirred for 20 minutes, a homogenous non-skid composition was obtained.

| | | Examples V–XIX prepared as in Example 1 | | | |
|---|---|---|---|---|---|
| EXAMPLE | WATER | Kelzan ® S | Kathon ® LX1.5 (parts) | A STABLE UREA SILICA DISPERSON | CAB-O-GRIP II |
| V | 49.625 | 0.375 | | 50.00 | |
| VI | 49.50 | 0.50 | | 50.00 | |
| VII | 49.25 | 0.75 | | 50.00 | |
| VIII | 49.00 | 1.0 | | 50.00 | |
| IX | 49.50 | 0.5 | | 37.50 | 12.50 |
| X | 49.50 | 0.5 | | 33.0 | 16.70 |
| XI | 49.50 | 0.5 | | 25.0 | 25.0 |
| XII | 74.75 | 0.25 | | | 25.00 |
| XIII | 74.5 | 0.4 | 0.1 | | 25.00 |
| XIV | 74.0 | 0.8 | 0.2 | | 25.00 |
| XV | 49.75 | 0.25 | | | 50.00 |
| XVI | 49.6 | 0.4 | | | 50.00 |
| XVII | 49.5 | 0.5 | | | 50.00 |
| XVIII | 25.0 | 0.4 | | | 74.60 |
| XIX | 7.0 | 0.2 | | | 100.00 |

XX. Using a form of xanthan gum (Keltrol® F) which is not surface treated as is the Kelzan® S and is therefore more difficult to easily disperse, 99.01 parts of a stable urea silica dispersion was mixed with 0.792 parts of Keltrol® F until smooth, then 0.198 parts of Kathon® LX1.5 was mixed in. The resultant composition was ready to be diluted 1:1 with water for use.

All of the exemplar compositions exhibited marked decrease in misting and clogging with out deterioration of the usual non-skid characteristics.

While this invention may be embodied in many different forms, there are described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. In a sprayable non-skid composition consisting essentially of an aqueous dispersion of colloidal silica, the improvement comprising including a quantity of xanthan gum in an amount effective to prevent substantial phase-out of the silica dispersion and to limit misting when the composition is sprayed, wherein the amount of gum is in the amount effective to prevent substantial phase out of the silica dispersion and to limit misting when the composition is sprayed.

2. The composition of claim 1 including urea in an aqueous dispersion of colloidal silica.

3. The composition of claim 1 including additives in minor amounts selected from the group consisting of rust inhibitors, defoamers, alkaline agents, and preservatives.

4. The composition of claim 1 comprised of 0.5 to 19 parts silica, 0.15 to 1 part xanthan gum, balance to total of 100 parts, water.

5. The composition of claim 1 comprised of 3 to 6 parts silica, 0.4 to 0.8 parts gum, balance water.

6. The composition of claim 5 comprised of 3 parts silica and 0.5 parts gum.

7. The composition of claim 5 comprised of 5 parts silica and 0.5 parts gum.

8. The composition of claim 1 wherein the silica is amorphous silica.

9. The composition of claim 1, in which the amount of gum is about 0.15 parts or greater, based on a composition of 100 parts.

* * * * *